(12) United States Patent
Kamrowski (10) Patent No.: US 9,354,864 B2
(45) Date of Patent: May 31, 2016

(54) PACKAGE HEADER SYSTEM AND METHOD TO FACILITATE STREAMING A SINGLE FIRMWARE FILE UPGRADE

(75) Inventor: Brian Kamrowski, Amherst, NY (US)

(73) Assignee: Dialogic Corporation, Montreal (CA)

( * ) Notice: Subject to any disclaimer, the term of this patent is extended or adjusted under 35 U.S.C. 154(b) by 1371 days.

(21) Appl. No.: 12/151,660

(22) Filed: May 8, 2008

(65) Prior Publication Data

US 2009/0282399 A1    Nov. 12, 2009

(51) Int. Cl.
*G06Q 20/00*    (2012.01)
*G06F 9/44*    (2006.01)

(52) U.S. Cl.
CPC .................................... *G06F 8/68* (2013.01)

(58) Field of Classification Search
USPC ....................... 705/500, 50; 726/22
See application file for complete search history.

(56) References Cited

U.S. PATENT DOCUMENTS

| | | | |
|---|---|---|---|
| 6,223,345 B1 * | 4/2001 | Jones et al. | 717/100 |
| 7,146,609 B2 * | 12/2006 | Thurston et al. | 717/169 |
| 7,805,765 B2 * | 9/2010 | Challener et al. | 726/26 |
| 7,913,246 B2 * | 3/2011 | Hammond et al. | 717/173 |
| 2003/0097363 A1 * | 5/2003 | Dorsey | 707/100 |
| 2003/0217358 A1 * | 11/2003 | Thurston et al. | 717/174 |
| 2006/0265549 A1 * | 11/2006 | Chapel et al. | 711/113 |
| 2007/0250536 A1 * | 10/2007 | Tanaka et al. | 707/104.1 |

* cited by examiner

*Primary Examiner* — John Hayes
*Assistant Examiner* — John M Winter
(74) *Attorney, Agent, or Firm* — Chapin IP Law, LLC (57) ABSTRACT

The disclosed system and method provides a software package header that includes a copy of a firmware file header for a firmware file constituent of the software package. The package header is provided to a network service device such as a gateway as an initial portion of a software package to perform a firmware installation. The package header content is used to validate firmware files expected to be received and installed by the network service device. The package header structure permits all firmware files to be validated prior to the installation of any of the firmware files, while avoiding the use of additional network service device resources.

34 Claims, 4 Drawing Sheets

PACKAGE HEADER SYSTEM AND METHOD TO FACILITATE STREAMING A SINGLE FIRMWARE FILE UPGRADE

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The presently disclosed system and method relates generally to remote firmware installations, and more particularly to a software package header configuration to facilitate the transfer and installation of firmware files in a remote embedded device.

An embedded device is a special purpose computer system that typically performs a dedicated set of tasks. The embedded device has limited memory to reduce costs and power consumption, and improve efficiency of the embedded device. Examples of embedded devices include gateways that process communications in a communication network. When an embedded device is installed, upgraded or configured, the firmware of the embedded device is modified, often with firmware files in the form of image files. The firmware files can be collected together in a software package to be provided to the embedded device for collective installation.

The embedded device can implement a web server through which the firmware files contained in the software package can be transferred to the embedded device. Because the embedded device has limited temporary storage, and the web server receives a software package containing firmware files through serial communication, each of the firmware files in a software package is checked and committed to firmware storage upon receipt. Each firmware file in a software package is received in sequence with the serial transmission between the client and the server, for example, so that each firmware file is checked as it is received and stored in firmware memory, followed by the receipt of another firmware file into the temporary storage of the embedded device.

If there is a problem with a firmware file, such as may occur because of a hardware incompatibility, having an incorrect build date or having an improper version of the firmware file, the software package installation can fail, and the embedded device may be left in an unknown or inoperable state. For example, one or more firmware files may be received, validated and committed to memory, after which an invalid firmware file is received, and the software package installation process is terminated. The already installed firmware files remain in the memory of the embedded device, which memory may be permanent storage where the installed firmware files overwrite previous data. The already installed firmware files may not be compatible with the set of firmware files remaining in firmware after the termination of the installation process. The embedded device in such a state may operate improperly and be in need of repair and may need to be taken off line to execute repairs. Software package installations or service for the embedded device are complicated by the communication protocol between the client and server, in which the client is unable to modify files existing on a server for reasons such as security precautions. It would be desirable to obtain a mechanism for providing a software package installation to an embedded device in a client-server environment without increasing the resources used by the embedded device.

BRIEF SUMMARY OF THE INVENTION

In accordance with the disclosed system and method, a software package used to install software in an embedded device includes a package header that contains copies of firmware file headers taken from firmware files included in the software package. According to an exemplary aspect, the package header is included at the beginning of a stream of serial data supplied to the embedded device, prior to firmware file data being received at the imbedded device. The embedded device can use the package header to validate all the firmware files prior to receipt and installation of the firmware files. Validation means that, based on examination of a firmware file header, the associated firmware file is compatible with embedded device hardware, has an appropriate build date or has a proper version, or is otherwise judged to be appropriate for installation in the embedded device. The package header is transferred from a client to a server using, for example, an HTTP post method. Transfers using the HTTP post method occur in an atomic operation, meaning that the transfer is done automatically as a unit. Accordingly, a transfer done with the HTTP post method does not use multiple or separate operations, and does not require user intervention. The package header is stored by the embedded device in a small temporary storage location upon receipt, and the embedded device uses the information contained in the package header to determine, for example, if all the firmware files that are to follow are compatible with the embedded device. The package header is validated during the execution of the current HTTP post method. Once the entire set of firmware files provided in the software package are validated using the package header, each of the firmware files may be received in the serial transmission using the already active HTTP post method and installed in the embedded device upon receipt. Each firmware file can be checked upon receipt to ensure that it is intact and was received properly, for example by calculating and evaluating a checksum value. Once each of the firmware files is received and installed, the embedded device can operate properly with the new installation.

If the embedded device determines, based on an examination of the package header, that any of the firmware files are incompatible with the embedded device, the installation can be terminated, so that the remaining information received as part of the software package is disregarded. Whether or not the installation is successful, the server can provide the client with status information regarding the installation process.

BRIEF DESCRIPTION OF THE SEVERAL VIEWS OF THE DRAWINGS

The disclosed system and method are described in greater detail below, with reference to the accompanying drawings, in which.

DETAILED DESCRIPTION OF THE INVENTION

An embedded device is a special purpose computer system designed to perform dedicated functions, often independently or as part of a larger system. Embedded devices are often called upon to operate in real time within constraints based on size, power, cost, and/or flexibility. Dedicated program instructions provided in the embedded device permit the embedded device to carry out its functional tasks, and are often stored in "firmware," which represents special purpose hardware, software or a combination thereof. Firmware is typically implemented as nonvolatile storage media, including, by way of non-limiting examples, ROM, EPROM, FLASH, or SRAM storage memory. Firmware storage is characteristically limited in size to reduce cost and size of the overall embedded device, and is infrequently, if at all, updated or reconfigured. For example, a reconfiguration of firmware that is implemented through a ROM involves the removal and replacement of the ROM with one that has been programmed with a new program instruction configuration. Similarly, when firmware is implemented in the form of reprogrammable non-volatile storage media, such as, EPROM, FLASH or SRAM, for example, the firmware can be reconfigured or reprogrammed by loading a new image, or image file, into the storage media.

A typical firmware configuration involves a reprogrammable, non-volatile storage media into which image files are loaded when the embedded device is installed, upgraded, configured, or when the system or device boots, the loading of such image files or other manipulation of a content of the storage media being referred to herein as an installation. The image files are typically loaded into the non-volatile storage memory through various techniques, including file transfer, storing file image copies in the storage media, executing a program that loads the storage media with desired data, for example, in accordance with a structured format, and any other technique that can load desired data into the non-volatile storage media.

In the case of an embedded device that is coupled to a network, it is often advantageous to load programs and files into the embedded device over a network connection. Such a configuration permits a rapid installation of a number of embedded devices with a reduced administrative burden. An example of such an embedded device is a network service device, such as a gateway, which can provide network services, such as switching or translation between a given communication protocol or standard and another communication protocol or standard. Examples of such gateways include the Dialogic 1000 Media Gateway series or the Dialogic 2000 Media Gateway series, which are commercially available from Dialogic Corporation of Montreal, Quebec, Canada.

Figure 1:
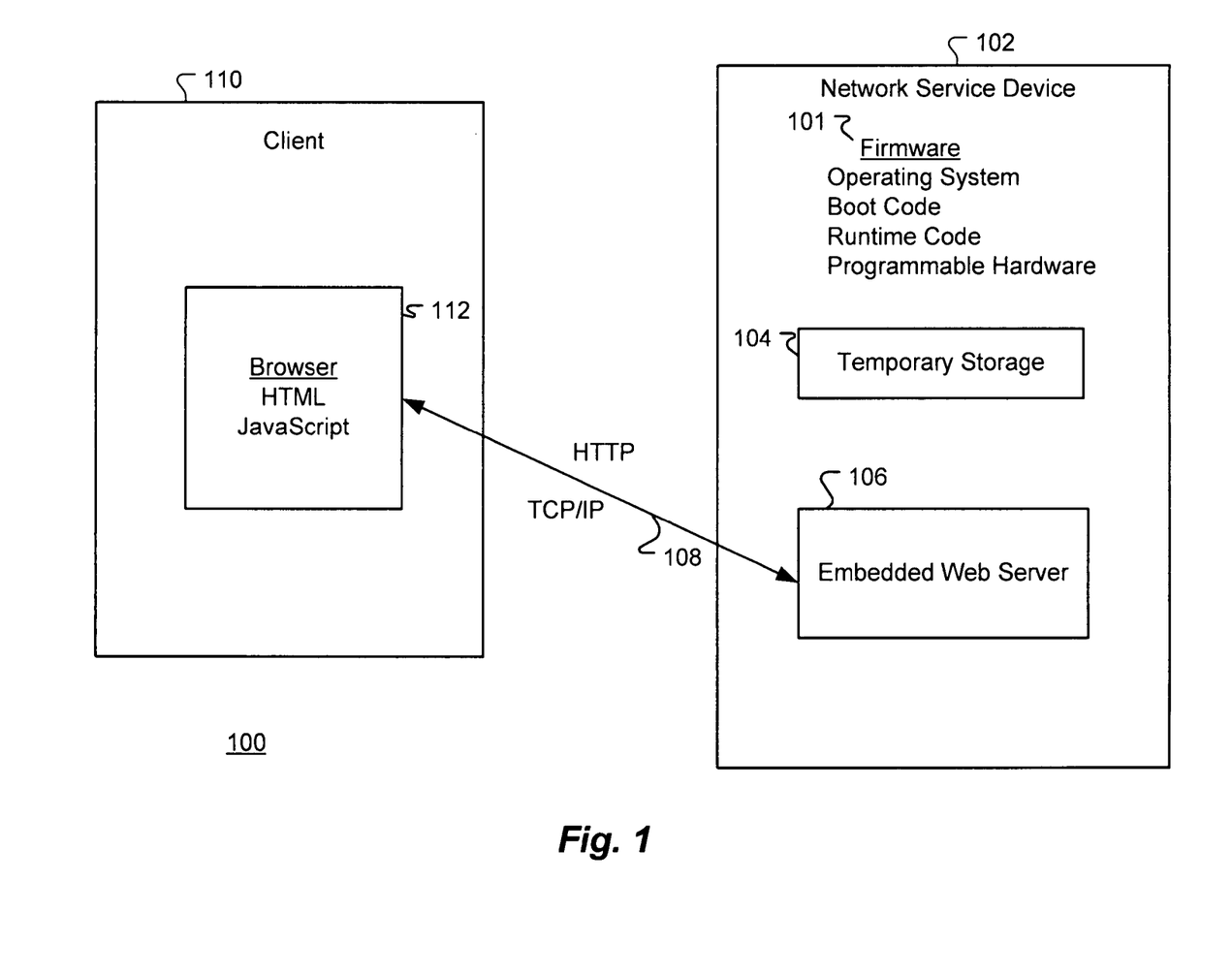
FIG. 1 is a diagram of a network communication link involving a client and a server, where the server is part of an embedded device.

Referring now to FIG. 1, an exemplary embodiment of a network service device 102 implemented as a gateway as described above is shown in a client-server configuration 100. Network service device 102 is typically configured as an embedded device, with an embedded web server 106. Server 106 provides access to network service device 102 to permit an administrator to perform an installation by establishing a network connection 108 using a client 110 to connect to server 106. In client-server configuration 100, an Internet protocol and interface are typically employed to exchange data between client 110 and server 102. For example, client 110 may include a web browser 112 that implements a user interface for an administrator to interact with network service device 102 through embedded server 106. Browser 112 on client 110 and server 106 typically employ a hypertext transfer protocol (HTTP) for data communication exchange. In accordance with the HTTP protocol, an administrator can load a file from client 110 to server 102 that can be stored in the nonvolatile memory of firmware 101 of network service device 102 to perform an installation. For example, file data transmission using browser 112 can be implemented with the HTTP post method using the <input type=file> HTML (hypertext markup language) file form element.

Due to the nature of HTTP communications, data provided to server 106 is not available to client 110 as the data is received by server 106. For example, the data provided to server 106 in a data transfer may not be visible to client 110 during or after the transfer. For example, the activities available to client 110 for manipulating information on server 106 may be limited to providing a file to server 106 or browsing for a file name on server 106. A JavaScript implemented script that is running in browser 112 cannot, for example, access a file name, file path or file data on server 106. These limiting precautions are mainly for security reasons to help to avoid the possibility of malicious websites, web pages or scripts accessing and manipulating local client files. These issues for communicating with server 106 are also present in other types of transfer protocols, including such popular protocols as FTP (file transfer protocol).

The above-described security precautions are intended to maintain the integrity and prevent remote modification of server 106, as well as provide security protection for files located on client 110. However, these precautions represent challenges in providing an installation to an embedded device, such as network service device 102, through embedded server 106.

In particular, it is advantageous to provide a software package to network service device 102 to perform an installation with a relatively high degree of confidence that the software package can be successfully installed. Because of the lack of availability of means to directly verify a successful software package installation, it can be difficult to assure that an installation is successful and that network service device 102 is left in a known state. It should be possible to provide an administrator with a high level of confidence that the installation of a software package will be successful and leave network service device in a known state, otherwise the administrator may not wish to perform an upgrade. For example, the administrator would not wish to have a situation in which there is an incompatible set of firmware files installed in network service device 102. Because the administrator or other users are unable to verify the state of the firmware of network service device 102, a high degree of confidence for a successful installation may rest mainly with the technique used to install the software package in network service device 102.

There is a facility available using HTTP commands, in which a file can be transferred from client 110 to server 106 on a remote basis. For example, an HTTP post method may be used to send a file from client 110 to server 106. Other types of file transfer protocols and methods may also be used. The HTTP post method for file upload from client 110 to server 106 is a practical default file transfer protocol available to an HTML page running in browser 112. Implementation of a file upload feature inside an HTML page is popular and desirable because no additional Java or ActiveX plugins need be downloaded, configured, trusted, signed or maintained. In general, web browsers such as browser 112 are compatible with the HTML file form element, without the need of additional plugins. The use of the HTTP post method for file transfer from client 110 to server 106 is also considered to be a safe practice due to the security restrictions imposed by browser 112.

When the HTTP post method is used for uploading a file from client 110 to server 106, server 106 receives the file name and file data serially with no feedback or control of the connection or data transmission. That is, server 106 reads the file data as received in the serial stream provided from client 110 and uploads and processes the file in accordance with any further programming or security measures implemented on server 106.

In an embedded device, such as, for example, network service device 102, firmware installations typically involve a number of different firmware files in a software package provided to the embedded device through a file transfer. Such a file transfer may be implemented using the HTTP post method described above. Network service device 102 receives the software package containing a number of firmware files in a data stream provided through the file transfer. The data stream is provided in accordance with the HTTP post method, for example, and network service device 102 installs the firmware files as they are received. The HTTP file data transmission is performed serially in one atomic operation. It is not stopped, restarted, rewound or otherwise controlled, with the exception of packet confirmation in accordance with the transport control protocol/Internal protocol (TCP/IP) used to physically send the files—that is, the HTTP post method provides for a single data transmission per transaction.

Conventionally, a software package containing a number of firmware files is installed by being transmitted using the HTTP post method. The entire software package is provided in a single atomic transmission from HTTP client 110 to HTTP server 106. The software package is received serially and temporarily stored in a temporary storage 104 during firmware file installation in firmware 101. As part of the receipt and installation process, network service device 102 can check each received firmware file stored in temporary storage 104 for various characteristics prior to the file being committed to storage in firmware 101. For example, network service device 102 can cause each firmware file header to be examined to determine if the firmware file is compatible with the hardware configuration of network service device 102. Temporary storage 104 can be smaller than a firmware file delivered in the software package, so that portions of each firmware file are written to firmware 101 upon receipt, once a header of the firmware file is examined and validated. Each of the firmware files may take the form of an image file, so that committing such a file to storage installs the file, which can then become active to contribute to operating the embedded device.

Because client 110 does not conventionally interact with each firmware file received by server 106 for the reasons discussed above, client 110 is unable to verify that each firmware file is received properly and intact in temporary storage 104, and that the version and other characteristics of the firmware file are compatible with the version of the hardware for which it is to be installed. One way to improve the verification of an installation is to cause server 106 to check and validate each file upon receipt in temporary storage 104, prior to committing the file to storage in firmware 101. Each firmware file includes a header that contains information about the file, such as, for example, a checksum, version information, build date or supported hardware platforms. Server 106 can compute a checksum for the firmware file in temporary storage 104 to verify proper receipt of the entire file, check the version and build date to ensure that they are the same or newer than those of the presently installed firmware file or verify that the received firmware file is compatible with the hardware platform with which network service device 102 is operating. Once validated, server 106 can commit the firmware file to storage in firmware 101, and the programming in the firmware file can begin operating.

As discussed above, a software package provided to an embedded device for installation may include a number of firmware files, each of which are received, validated and committed to firmware storage in turn. If the embedded device receives, validates and commits some of the firmware files to storage, and a firmware file incompatibility is then detected with a subsequent firmware file, the installation typically fails and is halted. Due to the nature of the HTTP file transfer, there generally is no option available for undoing the installation. As a result of the failed installation, the embedded device may not operate properly and is typically shut down until the programming in the embedded device can be repaired. Repairing an embedded device that is unable to operate properly because of a partial installation can be costly, time consuming and lead to undesirable situations in which the embedded device, such as network service device 102, is taken out of service.

One of the reasons that the network service device 102 receives, validates and commits firmware files to firmware 101 sequentially is that network service device 102 has limited storage capacity in temporary storage 104 due mostly to the nature of network service device 102 being implemented as an embedded device, in which case storage space is at a premium. In general, it is impractical for an embedded device to have additional storage memory that is largely unused, due to the significant percentage increase in costs involved in providing additional memory in comparison with the overall cost of the embedded device, as well as the innate inefficiency and consumption of resources associated with a larger than necessary storage memory. For example, additional unused memory consumes power that increases the cost of operation of the embedded device. In the field of embedded devices, even small percentage increases in costs associated with the devices can have a drastic impact on the commercial feasibility of implementing an embedded device, or of finding commercial acceptance for the embedded device in the marketplace. Accordingly, file transfers to an embedded device, such as network service device 102, over HTTP communication link 108, are achieved with temporary storage 104 using as little memory as possible to avoid the drawbacks incurred with additional unused memory discussed above. The limited amount of memory provided is utilized as efficiently as possible by providing individual firmware files to temporary storage 104 that are committed to firmware 101 as soon as they are validated.

It may be possible to configure temporary storage 104 to permit an entire software package sent from client 110 to be entirely stored in temporary storage 104. The firmware files in the software package may then all be completely validated prior to installation of any of the firmware files. However, the storage of the entire software package in temporary storage 104 would involve providing storage capacity that is at least as large as the software package size. By adding such a large amount of storage, which is almost always idle, the cost, size and power consumption of network service device 102 are all increased, making network service device 102 significantly less efficient and more costly, as well as being much less commercially preferable. Accordingly, making temporary storage 104 large enough to hold all firmware files, or the entire software package for validation prior to commitment to memory, is impractical.

In addition, installations for firmware are typically performed on systems already operating in the field. These legacy systems tend to have limited amounts of memory overall and very limited amounts of memory available for temporary storage. In one conventional example, the total available memory is approximately 16 megabytes, while the available temporary storage is approximately 128 kilobytes. These resources are used to install firmware files that can be as large as 32 megabytes. In such an instance, server 106 may conventionally validate a single file at a time in a sequence of files, with the limited amount of temporary storage being used to validate a file, upon which the entire serially transmitted file is committed to firmware 101. The limitation of being able to validate a single file at a time in a serial sequence of files can produce the incompatibility issues discussed above, where network service device 102 may be left in an unknown state if a software package installation is interrupted and terminated.

The limitation of maintaining temporary storage 104 as a relatively small amount of memory is a practical consideration for both legacy and newer systems for the reasons discussed above. That is, legacy systems tend to have limited amounts of overall storage and severely limited temporary storage. Newer systems that can potentially implement expanded amounts of memory may be limited by the preference to avoid large amounts of unused memory for the reasons of cost, power usage and commercial preferability, as discussed above.

Accordingly, if a software package installation is to be provided to network service device 102 through an HTTP compatible interface, significant challenges are presented in view of the security issues presented by the HTTP communication implementation, size and complexity of the software package for installation, as well as the limitations of temporary storage 104 implemented in network service device 102.

In accordance with the presently disclosed system and method, there is provided a package header for the software package housing the firmware files, where the package header includes information about all the firmware files in the software package. According to an exemplary embodiment, the package header includes copies of firmware file headers associated with firmware files contained in the software package. The package header is transmitted as an initial portion of the software package to server 106, and stored in temporary storage 104. The package header can be used to validate all of the firmware files that will be subsequently received, prior to installing any of the firmware files in firmware 101.

Figure 2:
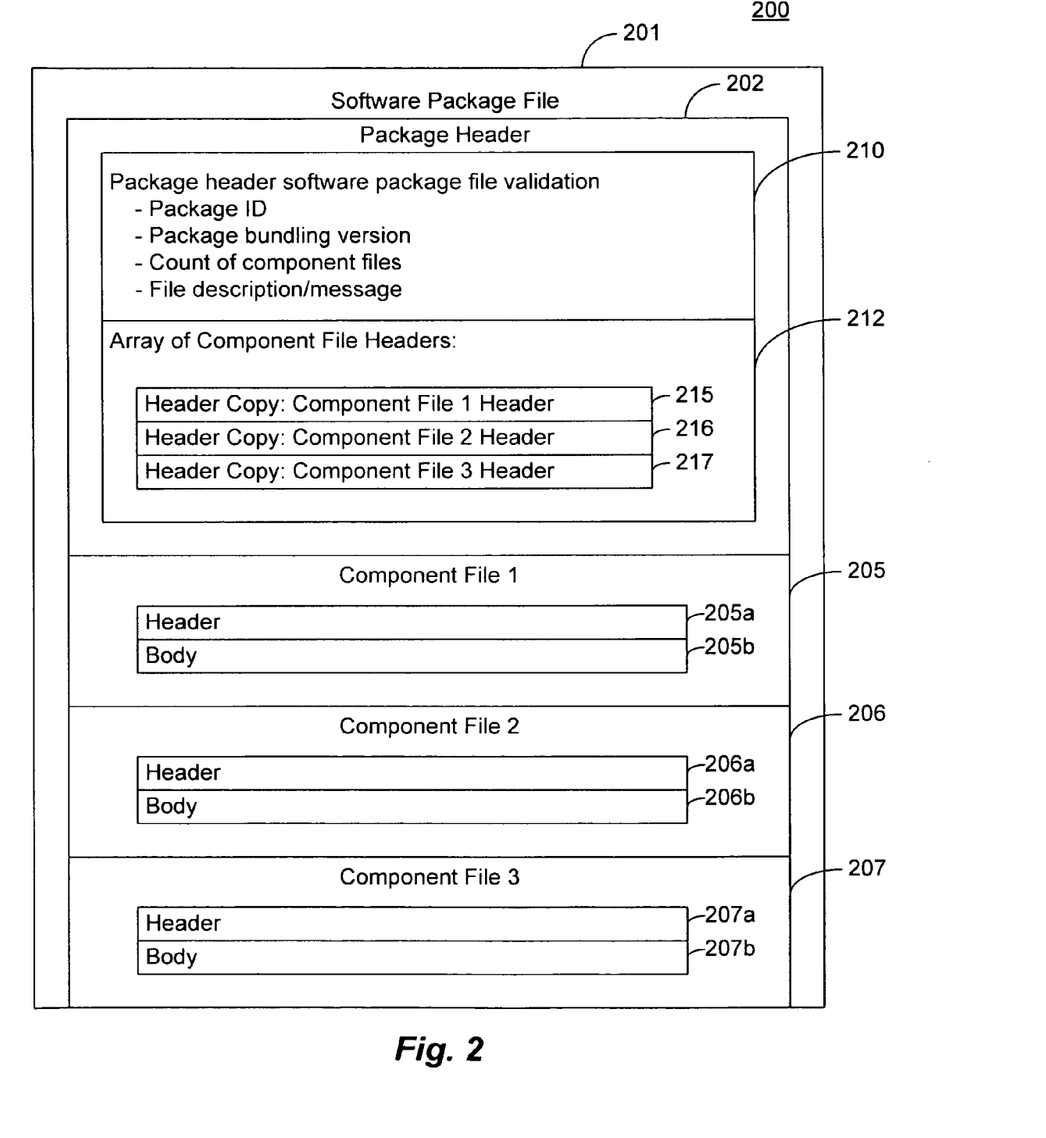
FIG. 2 is a diagram of the arrangement of a software package and package header in accordance with the disclosed system and method.

Referring now to FIG. 2, a file structure 200 for a software package file 201 is illustrated in accordance with an exemplary embodiment of the disclosed system and method. Software package file 201 includes four main components, a package header 202, a first component file 205, a second component file 206, and a third component file 207. Component files 205-207 are the firmware files that are to be installed in firmware 101 of network service device 102. Package header 202 includes a section 210 that has information about software package file 201 such as, for example, a package ID, a package bundling version, a count of component files, a file description/message and any other desirable information provided in relation to the specific software package file 201. Package header 210 also includes a section 212 that provides a listing of copies of file headers for each of component files 205-207.

As illustrated in structure 200, component files 205-207 each include a respective header 205a, 206a and 207a, and a respective body 205b, 206b and 207b. Each of headers 205a-207a may be proprietary, in that they may contain information specific to the respective component file 205-207 with a characteristic structure or organization of information concerning the respective component file 205-207 or body 205b-207b, or the contents or intended uses of component files 205-207. In accordance with an exemplary embodiment of the disclosed system and method, section 212 of package header 202 includes a copy of headers 205a-207a, provided as headers 215, 216 and 217, respectively.

When software package file 201 is transmitted from client 110 to server 106, for example, package header 202 is provided as an initial set of data in an HTTP data stream comprising the transmission. Package header 202 is stored in temporary storage 104 by server 106, where a network service device 102 can retrieve sections 210 and 212 to analyze and validate software package file 201 and component files 205-207. Package header 202 may be relatively small in size, so that a small portion of temporary storage 104 is taken up by package header 202. Accordingly, additional portions of software package file 201 can be received in temporary storage 104 while package header 202 is being analyzed. For example, some or all of first component file 205 may be received in temporary storage 104 while package header 202 is also stored in temporary storage 104 during the analysis.

Figure 3A:
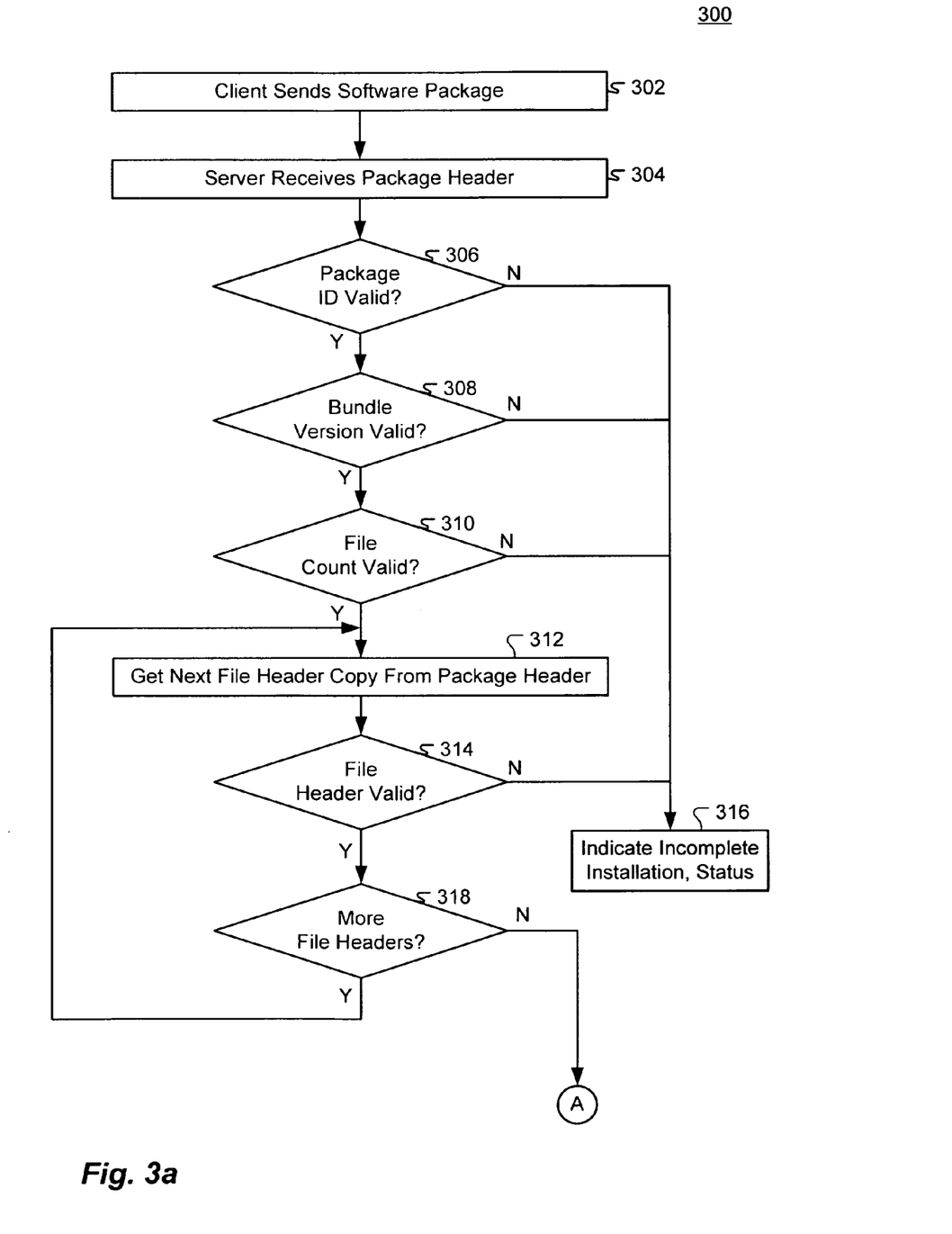
FIGS. 3a-3b are flow charts illustrating an installation process in accordance with the disclosed system and method.
Figure 3B:
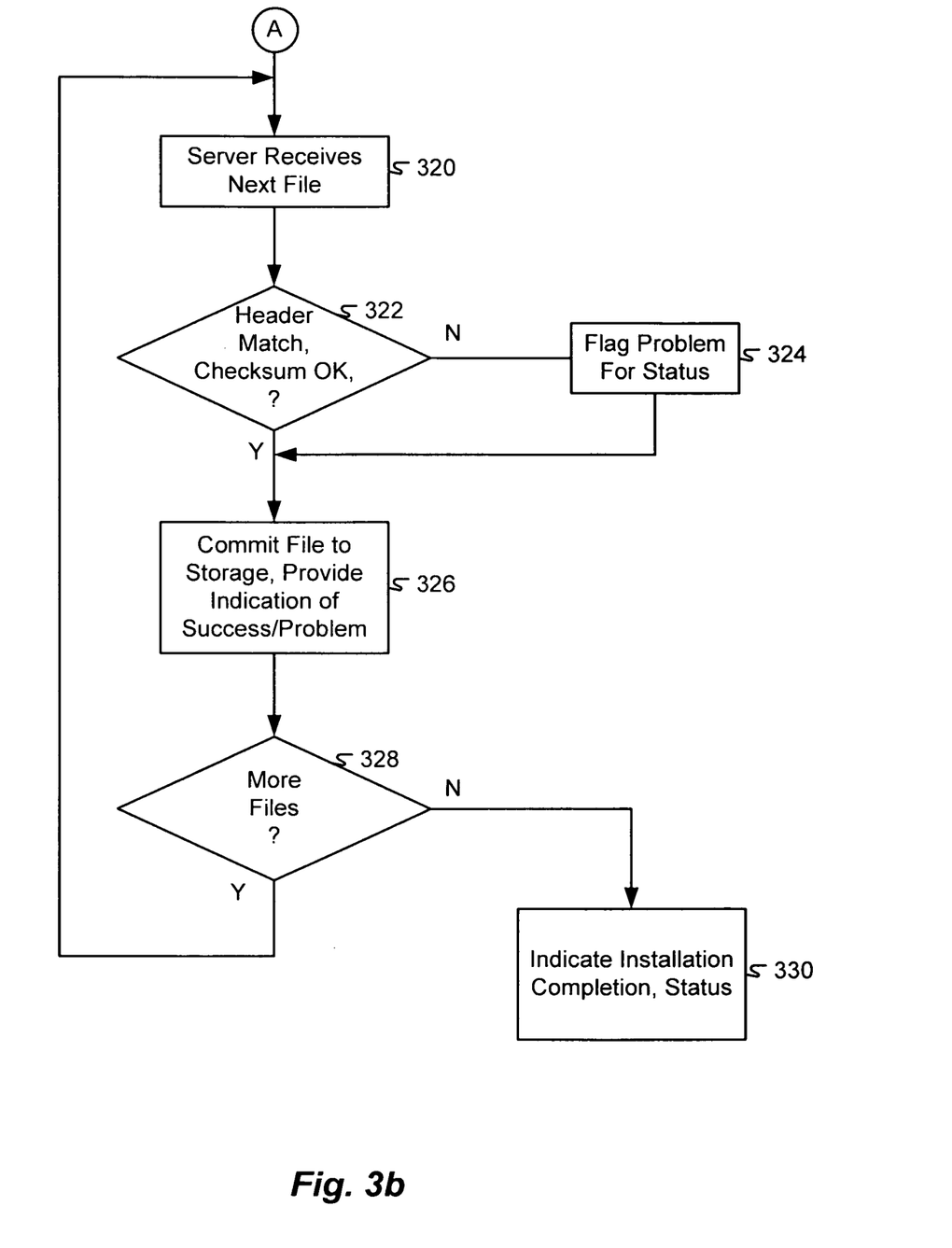

Referring now to FIGS. 3a-3b, a flow chart 300 illustrates a process for receiving, validating and installing a software package, such as a software package file 201. In block 302, client 110 provides software package 201 to server 106 where, for example, package header 202 is transmitted to server 106 as an initial portion of software package 201. In block 304, server 106 receives package header 202 and processing proceeds to decision block 306. Package header 202 may be relatively small in comparison with temporary storage 104, for example, and can be completely cached in temporary storage 104. In decision block 306, the package ID provided in section 210 of package header 202 is checked for validity. An invalid package ID indicates that the received data is not part of a package file. In such an event, processing proceeds from decision block 306 through the NO branch to a block 316 in which a message can be returned to the client to indicate incomplete installation, which may be accompanied by a status indication. The status indication may provide additional information about the file transfer or installation attempt.

If the package ID is determined to be valid in decision block 306, processing proceeds on the YES branch to decision block 308, in which the validity of the bundle version of the software package is determined. If the bundle version is not valid in decision block 308, processing proceeds along the NO branch to block 316, with a resulting message being produced as described above. A bundle version may be invalid if it is newer than expected, which may cause the software package to be processed incorrectly. If the bundle version is determined to be valid in decision block 308, processing proceeds along the YES branch to decision block 310, in which the validity of the file count is determined. If the file count is determined to be invalid in decision block 310, processing proceeds along the NO branch to block 316. The file count is determined to be invalid if it exceeds a threshold value, which would indicate that the contents of the software package may contain invalid data.

At this point in the process of receiving a software package, server 106 may provide a message to client 110 to display a file description or message as unbundling of the software package proceeds. In addition, network service device 102 may store additional information contained in package header 201 within temporary storage 104 or elsewhere within network service device 102. The additional information may include such items as a cyclical redundancy check (CRC), a check sum, a hash, encryption data, a license and/or any other type of information that may be useful in receiving, validating and installing software package 201.

If the file count is determined to be valid in decision block 310, processing can proceed along the YES branch to block 312, in which a file header copy 215 is read and analyzed for validation. The reading and validation of the file header copy may be done as soon as the file header copy is received in temporary storage 104.

A decision block 314 determines whether a file header copy is valid. The validation technique performed in decision block 314 may be specific to the type of component file header 205-207, or the validation technique may be common to all component files 205-207. Validation may take place, for example, on the basis of whether the firmware file is compatible with the hardware platform on which it is to be installed. Other information available in file header copies 215-217 may include a software version, a build date or supported hardware platforms, any of which may be used in the validation process. If a determination is made in decision block 314 that the file header copy is invalid, the NO branch of decision block 314 is taken to block 316, which operates as described above. In the case where block 316 is reached from the NO branch of decision block 314, none of the firmware files are committed to storage, and a relevant failure indication is provided, which may be in the form of a particular status provided through block 316. In addition, further software package data being transmitted to server 106 is ignored, for example by flushing the HTTP transmission.

If a determination is made in decision block 314 that the file header copy is valid, the YES branch is taken to decision block 318, in which a determination is made as to whether more file header copies are available in the package header for processing. If all the file headers have been processed, decision block 318 directs processing to the NO branch to continue the installation process. If there are more file header copies to process, decision block 318 takes the YES branch directed to block 312, in which the next file header copy is read and analyzed. Blocks 312, 314 and 318 continue to be traversed until all the file header copies have been processed, or until a file header copy is found that is invalid, in which case processing transfers to block 316.

When the NO branch is taken from decision block 318, meaning that all file header copies have been processed and found valid, the firmware files in a software package can be installed in the network service device. At this point in the processing of the software package, all the firmware files have been validated through analysis of the file header copies provided in the package header as an initial portion of the software package. Because all of the firmware files have been validated before being all received in temporary storage 104 in network service device 102, a confidence level of obtaining a successful installation is increased. The likelihood that network service device 102 is placed in a known, good state after the installation of the software package is greatly improved. In addition, no changes need be made to temporary storage 104, which can be made small enough to store a fraction of a single firmware file at a time, and still handle an installation of a software package that may contain a relatively large number of firmware files. This facility permits a relatively large software package to be uploaded from client 110 to network service device 102 for the purposes of a firmware installation while taking advantage of the widely used standards of HTTP and HTML, with their inherent limitations.

Referring now to FIG. 3*b*, flowchart 300 continues with a block 320, in which server 106 receives a firmware file as part of software package file 201. According to an exemplary embodiment, each firmware file can be further examined for lack of corruption, having certain features or elements, or other criteria as may be useful upon installation of the firmware files. Decision block 322 performs various optional checks and analyses on each firmware file received, and notes any problems through the NO branch by setting a flag or status in block 324. In accordance with one exemplary embodiment, the procedure illustrated in flowchart 300 can terminate upon a flag being set or a status being changed in block 324. In such an instance, the already installed firmware files operate with the prior versions of firmware that have not yet been updated as part of the installation. In such an instance, network service device 102 may be placed in an unknown state, however, a level of compatibility may be maintained between the older firmware and the newly updated firmware to permit network service device 102 to continue to operate. Alternately, the procedure illustrated in flowchart 300 does not terminate, and processing from block 324 proceeds to block 326.

If the firmware file otherwise checks out, the YES branch of decision block 322 is taken, leading to block 326, in which the firmware file is committed to storage in firmware 101. Block 326 also permits an indication to be formed to show the successful commitment of a firmware file to storage, or any difficulties encountered in the analysis conducted in decision block 322. Processing then proceeds to decision block 328, in which a determination is made as to whether additional firmware files are to be received, read, validated and installed. If more firmware files are to be processed, the YES branch of decision block 328 is taken to obtain the next firmware file in block 320. If all the firmware files have been processed, the NO branch of decision block 328 is taken to block 330, in which an indication is provided of the completion of the installation process. Block 330 may also provide various status information regarding the installation process, including any notation of errors, problems or other events related to the receipt, validation and installation of firmware files.

In accordance with block 320, 322, 226 and 328, each firmware file, such as each component file 205-207, is received, read and installed in turn. When processing has proceeded to the point in flowchart 300 denoted with the letter "A", network service device 102 can cause each of the received firmware files to be installed in turn, even if an error is detected in the content of one or more of the firmware files. In accordance with an exemplary embodiment, network service device 102 can further check each individual component file 205-207 and cause the installation to be stopped or modified if a given component file is determined to be corrupted, for instance. In general, however, once all component files 205-207 have been validated using the file header copies 215-217 in package header 202, the firmware files will all be installed and committed to firmware 101.

The arrangement of firmware files and file headers as illustrated in structure 200 of FIG. 2 provides a number of advantages in addition to facilitating a reduced memory size for temporary storage 104. For example, the original firmware files provided as part of the software package can be stored in an unmodified form within the software package—that is, the firmware files themselves need not be modified to be provided to and installed in the network service device in accordance with the disclosed system and method. Another advantage in accordance with the disclosed system and method is that each firmware file may have a different proprietary header, for example. Thus, multiple different header types are supported in accordance with the installation. A further advantage provided by the disclosed system and method is that the software package can be easily unbundled into its component parts, including the firmware files.

The operations herein described are purely exemplary and imply no particular order. Further, the operations can be used in any sequence when appropriate and can be partially used. With the above embodiments in mind, it should be understood that the invention can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this invention. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the invention.

What is claimed is:

1. A method implemented by an embedded device to install in the embedded device a software package file receivable in a serial stream of data via a communication link coupled to the embedded device, the method comprising:
   providing the software package file including a software package header and at least one component file, the at least one component file including at least one component file header;
   providing a copy of the at least one component file header in the software package header;
   receiving, at a server embedded in the embedded device in a first portion of the serial stream of data, the software package header including the copy of the at least one component file header provided in the software package header;
   storing, by the server embedded in the embedded device, the software package header including the copy of the at least one component file header provided in the software package header in a storage media within the embedded device upon being received by the server;
   prior to the server receiving the software package file including the at least one component file in a remaining portion of the serial stream of data, determining, by the server embedded in the embedded device, a validity of the copy of the at least one component file header provided in the software package header in accordance with a predetermined set of criteria;
   making, by the server embedded in the embedded device in accordance with the determination of the validity of the copy of the at least one component file header provided in the software package header, an installation determination whether to store at least a portion of the software package file including the at least one component file in the storage media; and
   having made the installation determination to store at least the portion of the software package file in the storage media, storing, by the server embedded in the embedded device, at least the at least one component file in the storage media in a storage space smaller than a corresponding storage space requirable for storing the software package file.

2. The method according to claim 1, wherein the at least one component file includes an image file.

3. The method according to claim 1, wherein the at least one component file contains data related to one or more of an operating system, boot code, runtime code or a programmable hardware image.

4. The method according to claim 1, further comprising:
   determining the validity of the copy of the at least one component file header provided in the software package header in accordance with one or more of a software version, a build date or a supported hardware platform.

5. The method according to claim 1, further comprising:
   providing the software package header to the embedded device over an HTTP link.

6. The method according to claim 1, further comprising:
   reading and caching the at least one component file header provided in the software package header.

7. The method according to claim 1, further comprising:
   validating the software package header in accordance with another predetermined set of criteria.

8. The method according to claim 7, wherein the another predetermined set of criteria further comprises one or more of a package ID, a bundle version or a component count.

9. The method according to claim 1, further comprising:
   providing an indication of a status of the installation.

10. The method according to claim 9, wherein the status provided by the indication is one or more of success or failure of the installation.

11. The method according to claim 9, wherein the status provided by the indication reflects the completion of installation of the portion of the at least one component file.

12. The method according to claim 1, further comprising:
   processing the at least one component file with one or more of a CRC, checksum, hash, encryption data or license data.

13. The method according to claim 1,
   wherein the providing of the software package file includes providing the software package file including at least another component file, wherein the at least another component file each include another component file header, wherein the providing of the copy of the at least one component file header in the software package header includes providing a copy of the another component file header in the software package header, wherein the receiving of the software package header includes receiving, in the first portion of the serial stream of data, the software package header including the copy of the another component file header provided in the software package header, and wherein the method further comprises:
   determining a validity of each of the copies of the at least one component file header and the another component file header provided in the software package header in accordance with the predetermined set of criteria prior to permitting installation of at least a portion of each of the at least one component file and the at least another component file.

14. The method according to claim 13, wherein the predetermined set of criteria further comprises differing criteria for each of the at least one component file header and the another component file header.

15. The method according to claim 13, further comprising:
   determining the validity of the at least one component file header and the another component file header provided in the software package header prior to receiving the at least one component file and the at least another component file at the embedded device.

16. The method according to claim 1, further comprising:
   comparing the copy of the at least one component file header provided in the software package header with the at least one component file header included in the at least one component file after installing the at least one component file.

17. The method according to claim 1, further comprising:
   avoiding installation of the at least one component file in response to the installation determination.

18. The method according to claim 1, further comprising:
   providing a temporary storage in the embedded device, the temporary storage being smaller in size than the at least one component file;
   receiving part of the portion of the at least one component file in the temporary storage; and
   committing the part to a firmware storage from the temporary storage after the part is received in the temporary storage.

19. The method according to claim 1, the embedded device further comprising a gateway for processing calls in a communication network.

20. A system for providing an installation of a software package file to an embedded device in a serial stream of data over a communication link coupled to the embedded device, the system comprising:
   a client operative:
      to provide, over the communication link, a first portion of the serial stream of data, the software package file including a software package header and at least one component file, the at least one component file including at least one component file header; and
      to provide, in the first portion of the serial stream of data, a copy of the at least one component file header in the software package header; and
   a network device including an embedded server, a temporary memory storage, and a firmware storage, the embedded server including a processor coupled to the temporary memory storage and the firmware storage and operative to execute program instructions:
      to receive, from the client over the communication link, the first portion of the serial stream of data including the software package header including the copy of the at least one component file header provided in the software package header;
      to store the software package header including the copy of the at least one component file header provided in the software package header in the temporary memory storage;
      to inspect the copy of the at least one component file header provided in the software package header in accordance with a predetermined set of criteria to determine a validity of the at least one component file header provided in the software package header prior to receipt, at the embedded server from the client, of the software package file including the at least one component file in a remaining portion of the serial stream of data;
      to make, in accordance with the determination of the validity of the copy of the at least one component file header provided in the software package header, an installation determination whether to store at least a portion of the software package file including the at least one component file in the firmware storage; and
      having made the installation determination to store at least the portion of the software package file in the firmware storage, to store at least the at least one component file in the firmware storage in a storage space smaller than a corresponding storage space requirable for storing the software package file.

21. The system according to claim 20, wherein the at least one component file contains data related to one or more of an operating system, boot code, runtime code or a programmable hardware image for the embedded device.

22. The system according to claim 20, wherein the predetermined set of criteria further comprises one or more of a software version, a build date or a supported hardware platform.

23. The system according to claim 20, wherein the processor is further operative to execute program instructions to validate the software package header in accordance with another predetermined set of criteria.

24. The system according to claim 23, wherein the another predetermined set of criteria further comprises one or more of a package ID, a bundle version or a component count.

25. The system according to claim 20, wherein the processor is further operative to execute program instructions to process the at least one component file with one or more of a CRC, checksum, hash, encryption data or license data.

26. The system according to claim 20,
   wherein the software package file further includes at least another component file, the at least another component file each including another component file header, wherein the client is further operative to provide, in the first portion of the serial stream of data, a copy of the another component file header in the software package header, and wherein the processor is further operative to execute program instructions to inspect the at least one component file header and the another component file header provided in the software package header in accordance with the predetermined set of criteria to determine a validity of each of the copies of the at least one component file header and the another component file header prior to permitting installation of at least a portion of each of the at least one component file and the at least another component file.

27. The system according to claim 20,
   wherein the processor is further operative to execute program instructions to avoid the installation of the at least one component file upon the validation of the at least one component file header in accordance with the installation determination.

28. The system according to claim 20, wherein the temporary memory storage is smaller in size than the at least one component file.

29. The system according to claim 20,
wherein the processor is further operative to execute program instructions to determine a validity of the at least one component file using the at least one component file header provided in the software package header prior to receiving the at least one component file.

30. The method according to claim 1 wherein the receiving of the first portion of the serial stream of data that includes the software package header includes receiving the software package header at a beginning of the serial stream of data.

31. The method according to claim 1 wherein the receiving of the first portion of the serial stream of data that includes the software package header includes receiving the software package header as an initial set of data in the serial stream of data.

32. The system according to claim 29 wherein the first portion of the serial stream of data corresponds to a beginning of the serial stream of data.

33. The system according to claim 29 wherein the first portion of the serial stream of data corresponds to an initial set of data in the serial stream of data.

34. The method according to claim 1 wherein the providing of the copy of the at least one component file header in the software package header includes copying the at least one component file header to the software package header.

\* \* \* \* \*